April 2, 1957     H. F. GOECKEL     2,787,346

HARDWARE ATTACHING MEANS

Filed May 12, 1953

Inventor
Howard F. Goeckel
By Nobbe & Swope
Attorneys

2,787,346
HARDWARE ATTACHING MEANS

Howard F. Goeckel, Holland, Ohio, assignor to Libbey-Owens-Ford Glass Company, Toledo, Ohio, a corporation of Ohio Application May 12, 1953, Serial No. 354,602

3 Claims. (Cl. 189—46)

This invention relates broadly to panel construction and the attachment of hardware thereto. More specifically, it relates to an improved alloy suitable as a filler material for attaching hardware to panels of glass or like material.

Glass panels have found increased usage in modern building construction as doors, walls, partitions, and the like. These panels have been found particularly useful as facing members and partitions for toilet stalls as well as for heavy door construction. Difficulties are encountered, however, in attaching the necessary articles of hardware, such as hinges, sashes, and lock and handle mountings, to the glass panels. That is, due to the brittle nature of the glass, these articles of hardware cannot be satisfactorily screwed, bolted, or nailed thereto, as in the case of conventional wood or metal panels.

Thus, it has been proposed to "anchor" the articles of hardware in recessed portions of the glass panel members. For this purpose, the hardware may be provided with protuberant portions which are adapted to be received in spaced relation to the recessed portions of the panel members. A solidified filler material in the space between said hardware and said panel member forms the anchor by means of which the hardware is securely attached to the panel member.

This anchor may be formed by assembling the article of hardware in properly disposed position with respect to the panel member and applying the filler material to the space therebetween in a molten condition. Upon hardening, the filler material is locked within the space so as to permanently position the portion of the hardware received in the recessed portion of the panel member in place.

It will be understood, therefore, that the filler material must meet certain requirements. Primarily, it must be capable of being poured into the space between the assembled hardware and panel member at a temperature which is sufficiently low as to injure neither the hardware nor the panel. At the same time, the melting point of the filler material must be sufficiently higher than that of the surrounding atmosphere under extreme weather conditions to prevent its softening during actual use of the completed panel construction. Still further, it will be appreciated that assembly procedures are expedited to a large extent when the filler material is of a nature which will set up or solidify relatively quickly.

A more permanent anchor is formed when the filler material also exhibits good "growth" characteristics. That is, it is of prime importance that the filler material be of a composition which will expand after solidification at room temperature. In this manner, assuming that the coefficient of expansion of the metal hardware adjacent which the filler material is poured is not appreciably different from that of the filler material, the growth of said filler material will cause a tight and secure anchoring of the article of hardware within the panel recess. Of course, if these expansion characteristics are considerably different, additional factors must be taken into account. For example, depending on the relative values of the coefficients of expansion of the metal hardware and the filler material, it may be found desirable to employ a filler material having a correspondingly higher or lower growth. Otherwise, it may be found that the filler material will cause an unsightly appearance adjacent the hardware attachment due to excessive growth and a tendency to bulge outwardly from said attachment. Even more important, excessive growth may cause the panel member or the article of hardware to be strained. On the other hand, it will be understood that too small a growth may result in an insecure and unsatisfactory anchor.

I have found that within certain ranges, alloys of bismuth, lead and tin have the properties necessary for use as a filler material and as well exhibit highly predictable growth characteristics which will enable the attachment of articles of hardware to panel members with an assurance of satisfactory performance previously unknown to the prior art. That is, I have found that alloys within the range of 30–40% bismuth, 50% lead, and 10–20% tin have growth characteristics which vary in direct proportion to the bismuth content thereof such that the amount of growth of the filler material—and thus its performance in anchoring the hardware within the panel recess—can be predicted to a large degree.

More particularly, I have found that a filler material composed of approximately 37.5% bismuth, 50% lead and 12.5% tin is especially well-suited for use as a filler material in the applications above described. Exposed surfaces of this particular alloy when solidified do not show pits or flaws and may be finished off smoothly and with little expenditure of time and effort. Still further, such a filler material exhibits excellent pouring characteristics due to the tin component thereof, which is believed to improve considerably its fluidity and wetting characteristics.

It is therefore an object of this invention to provide improved hardware attaching means for glass panels or the like.

It is another object of this invention to attach articles of hardware to glass panels or the like in an improved manner and with a minimum expenditure of time, cost and effort.

Still another object of this invention is to provide an improved filler material for anchoring hardware attachments to glass panels or the like.

A still more particular object of this invention is to provide an improved alloy suitable as a filler material and having predictable growth characteristics.

Other objects and advantages of the invention will become more apparent during the course of the following description when taken in connection with the accompanying drawings.

In the accompanying drawings, wherein like numerals are employed to designate like parts throughout the same:

Figure 1:
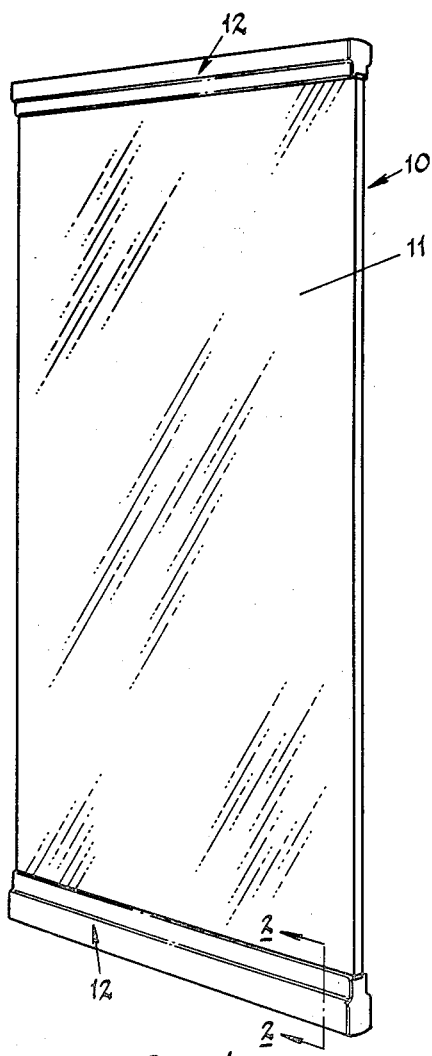
Fig. 1 is a perspective view of a glass door construction in which sashes are attached to the top and bottom edges thereof in accordance with the improved attaching means of this invention.
Figure 2:
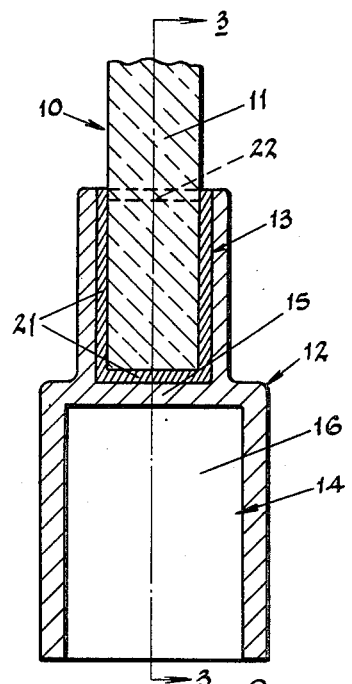
Fig. 2 is a transverse sectional view of the bottom edge of the door and sash attached thereto, taken substantially along the broken line 2—2 of Fig. 1.

Referring now particularly to the drawings, there is shown in Fig. 1 a glass door construction, designated in its entirety by the numeral 10 and comprising a panel 11 of tempered glass having metal sashes 12 attached to the top and bottom edges thereof in accordance with this invention. As shown in Fig. 2, each of the sashes 12 includes opposed channels 13 and 14 separated by a longitudinally extending web member 15.

Figure 3:
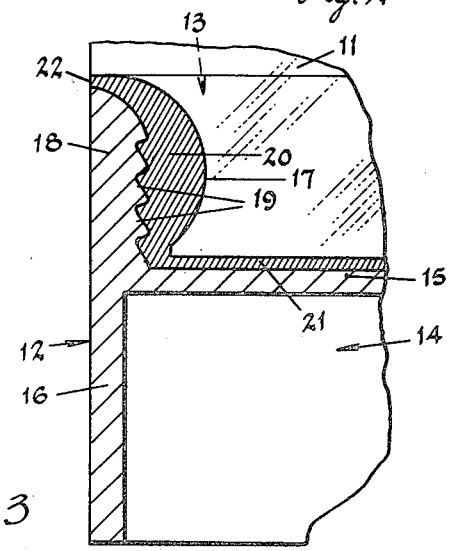
Fig. 3 is a longitudinal sectional view of the bottom edge of the door and sash attached thereto, taken substantially along the broken line 3—3 of Fig. 2.

The channel 14 is adapted to receive locking members, pivot pins, and the like for operation of the door and is provided at opposite ends with laterally extending closures 16. The channel 13, on the other hand, is adapted to receive an edge of the glass panel member 11 in spaced relation thereto, as best shown in Figs. 2 and 3. As previously mentioned, the panel edge may be recessed as at 17 and a closure 18 at the end of the channel 13 may be disposed opposite to said recess during the assembly of the panel edge in spaced relation to the channel. As shown in Fig. 3, the inner face of the closure 18 may be serrated as at 19 to form substantially interfitting protuberances with the oppositely facing recess 17 in the edge of the panel 11.

When the panel edge and sash have been assembled in properly disposed position with respect to one another, the filler material may be poured in a molten condition into the space therebetween and permitted to solidify to form the anchor 20 between the serrations 19 and recess 17 as well as to fill the longitudinally extending spaces, as at 21, if desired. As previously mentioned, I prefer to use a filler material made up of an alloy of approximately 37.5% bismuth, 50% lead, and 12.5% tin, which will pour at about 300° F. and solidify at about 210° F.

As also mentioned earlier, upon solidifying, the filler material will grow so as to provide a tight and secure fit or anchor 20 within the space between the serrations 19 and recess 17. For improving the appearance of the overall door construction, the channel closure 18 may be offset as at 22 along its upper edge a depth sufficient to substantially conceal the filler material adjacent thereto from view at opposite sides of the door. In this respect, it is noted that the alloy above disclosed has been found especially useful in that its growth is not so great as to cause the filler material to expand appreciably above the upper edge of the legs of the channel 13.

Still further, the growth of the range of alloys contemplated by this invention is predictable such that a suitable alloy may be chosen for a particular application with the assurance that the desired anchoring effect of the hardware may be obtained. Particularly, I have found that with the lead content constant at 50% and the bismuth content ranging from 30–40% and the tin from 10–20%, the growth of the alloy, taking place at room temperature from the time that it reaches said temperature until no further lineal change takes place, may be determined by the following straight line equation:

$$Y = 3(X - 27)$$

where:

$Y$ = growth $\times$ 10$^4$ (in./in.)
$X$ = percent bismuth

For example, if the alloy is 50% lead, 40% bismuth and 10% tin, the calculated growth is $39 \times 10^{-4}$ in./in. This agrees closely with experimental data which indicated a growth value of $39.1 \times 10^{-4}$ in./in. after 10,000 hours.

It will be understood that this growth value is what might be termed the "real" growth. This real growth will be approximately equal to the "apparent" or "effective" growth of the filler alloy when the hardware adjacent which the alloy solidifies has expansion characteristics that are similar to those of the alloy. For example, if the article of hardware is aluminum, from which glass panel door sashes are commonly constructed, the equation for real growth can be applied since the expansion characteristics of aluminum and the alloys contemplated by this invention are similar, the coefficients of expansion of each being $13.5 \times 10^{-6}$ per ° F. and $14.5 \times 10^{-6}$ to $16 \times 10^{-6}$ per ° F., respectively.

On the other hand, cold-rolled steel, from which other articles of hardware may be made, has a coefficient of expansion of about $6.7 \times 10^{-6}$ per ° F. In this case, the alloy would contract more than the hardware would while cooling to room temperature, and an insecure anchor would result unless the growth of the alloy exceeded this difference in contraction. The amount by which growth exceeds this difference in contraction is termed the apparent or effective growth. In the case of cold-rolled steel, the real and apparent growths of the alloy would differ appreciably. The apparent growth of the alloy would still be predictable, however, and would bear a predetermined relationship to the bismuth content thereof. For example, the apparent growth of the alloys of this invention when used for attaching articles of hardware of cold-rolled steel could be determined by the following equation:

$$Y = 3(X - 30.2)$$

where:

$Y$ = apparent growth $\times$ 10$^{-4}$ (in./in.)
$X$ = percent bismuth

Glass door constructions with aluminum hardware attached by means of a filler material consisting of 37.5% bismuth, 50% lead, and 12.5% tin have shown excellent resistance to weathering. Such door constructions showed no evidence of penetration of water or of damage or deterioration to the filler material and other door components after exposure to outdoor atmospheric conditions for several years and rapid cooling to 0° F. in a cold cabinet following periods of considerable rainfall. As well, there were no evidence of interfacial separations between the filler material and the panel edge and sash portions connected thereto, as might be expected in ordinary glass door constructions.

Figure 4:
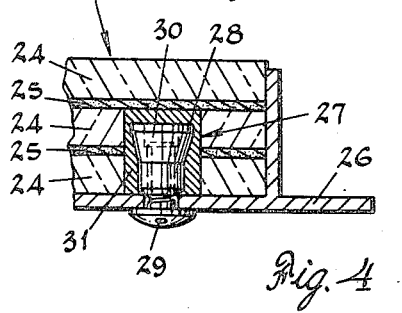
Fig. 4 is a detailed horizontal sectional view of an edge of a toilet stall portion with a door stop attached thereto in accordance with the improved hardware attaching means of this invention.

Fig. 4 is illustrative of another practical application of the novel hardware attaching means of this invention. As shown therein, a toilet stall partition or panel 23, composed of a plurality of opaque structural glass sheets 24 laminated to one another with a suitable mastic 25, is provided with a T-shaped metal door stop 26 which is attached thereto in accordance with this invention.

More specifically, two of the glass sheets 24 are drilled at matching locations therethrough to provide a cylindrical recess 27 in the partition or panel 23. A threaded sleeve 28 is permanently located in spaced relation to said recess and detachably secures a leg of the door stop 26 to said panel by a bolt 29 threadedly received therein.

According to this invention, the inner end of the sleeve 28 may be enlarged as at 30 and the filler material poured into the annular space surrounding said sleeve to form upon solidification an anchor 31. That is, the articles of hardware—door stop 26, sleeve 28, and bolt 29—are attached to the partition or panel 23 by means of said anchor, in a manner similar to that in which the sash 12 is attached to door panel 11 of Figs. 1 to 3.

It is to be understood that the forms of the invention disclosed herein are to be taken as the preferred embodiments thereof, and that various changes in the shape, size and arrangement of parts may be resorted to without departing from the spirit of the invention or the scope of the following claims.

I claim:

1. A toilet stall construction comprising, an opaque glass panel having an article of hardware attached thereto, a recess through at least a portion of said panel, a protuberant portion on said article of hardware received in spaced relation within said recess, and a solidified filler material locked in the spaced between said recess and said protuberant portion of the article of hardware, said filler material having a positive real growth of less than $39 \times 10^{-4}$ in./in., and consisting of approximately 30 to 40% bismuth, 50% lead, and 10 to 20% tin.

2. A panel construction including, a sheet of glass, a recess in a portion of said sheet, an article of hardware received in spaced relation to said recess, serrations in the hardware in opposed relation to said recess, and a solidified filler material anchored in the space between said recess and the serrations of said article of hardware, said filler material having a positive real growth of less than $39 \times 10^{-4}$ in./in., and consisting of approximately 30 to 40% bismuth, 50% lead, and 10 to 20% tin.

3. A glass door construction comprising, a glass panel, a recess in an edge of said panel, a metal channel member fitting over an edge of said panel and having a portion thereof positioned opposite said recess, serrations in said portion of the channel member facing said recess, and a solidified filler material received with said recess to secure said channel member to the glass panel, said filler material having a positive real growth of less than $39 \times 10^{-4}$ in./in. and consisting of approximately 37.5% bismuth, 50% lead, and 12.5% tin.

References Cited in the file of this patent

UNITED STATES PATENTS

| | | |
|---|---|---|
| 2,025,323 | Wunderle | Dec. 24, 1935 |
| 2,117,282 | Austin | May 17, 1938 |
| 2,200,387 | Erath | May 14, 1940 |
| 2,316,528 | Miles | Apr. 13, 1943 |
| 2,411,560 | Speed | Nov. 26, 1946 |

FOREIGN PATENTS

| | | |
|---|---|---|
| 607,661 | France | July 7, 1926 |

OTHER REFERENCES

Phillips: "Bismuth Solders," reprinted in "The Metal Industry," March 5, 1943, pp. 150–151. (Copy in Scientific Library.)

Seeds: "How to Select and Use Low-Melting Alloys as Production Aids," printed in "Materials and Methods," pp. 64–68, September 1950. (Copy in Scientific Library.)